(12) United States Patent
Sasatani et al.

(10) Patent No.: US 7,785,716 B2
(45) Date of Patent: Aug. 31, 2010

(54) INSERT-MOLDED ARTICLE, INSERT MOLD AND INSERT MOLDING METHOD

(75) Inventors: Yoshiaki Sasatani, Ibaraki (JP); Hiroshi Toda, Ibaraki (JP); Katsushige Uematsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1122 days.

(21) Appl. No.: 10/892,160

(22) Filed: Jul. 16, 2004

(65) Prior Publication Data

US 2005/0031375 A1 Feb. 10, 2005

(30) Foreign Application Priority Data

Jul. 18, 2003 (JP) ............................. 2003-199359
Jun. 10, 2004 (JP) ............................. 2004-172999

(51) Int. Cl.
*B29C 33/12* (2006.01)

(52) U.S. Cl. ..................... 428/592; 428/543; 399/120; 267/154; 267/155; 264/241; 264/259; 264/274; 264/275

(58) Field of Classification Search ................ 428/377, 428/592, 543; 425/117; 267/80, 243, 287, 267/289, 87, 83, 103, 179, 154, 155; 399/120, 399/111, 107; 264/241, 259, 274–275
See application file for complete search history.

(56) References Cited

U.S. PATENT DOCUMENTS 5,768,660 A * 6/1998 Kurihara et al. ............. 399/111
6,234,682 B1 * 5/2001 Nagaoka et al. .............. 385/78

FOREIGN PATENT DOCUMENTS

| JP | 3-13853 | 1/1991 |
|---|---|---|
| JP | 3-13853 | 2/1991 |
| JP | 4-100828 | 9/1992 |

(Continued)

OTHER PUBLICATIONS

Oberg et al. "Machinery's Handbook". Industrial Press Inc., 26th ed. (2000). pp. 286-332.*

*Primary Examiner*—Patricia L Nordmeyer
*Assistant Examiner*—Prashant J Khatri
(74) *Attorney, Agent, or Firm*—Fitzpatrick, Cella, Harper & Scinto (57) ABSTRACT

A bearing apparatus includes a coil spring having a center portion in which a wire is wound at a predetermined pitch, and end turn portions arranged at both end portions of the center portion. Each of the end turn portions is formed by winding the wire at least three turns with a pitch which is smaller than the predetermined pitch of the center portion. A bearing member has a main body with an opening for supporting a shaft, and a connecting portion for connecting the coil spring to the main body. The main body and the connecting portion are integrally formed from a resin material by molding, and the end turn portion of the coil spring is connected to the connecting portion through molding of the main body and the connecting portion. The connecting portion of the bearing member has an inner connecting portion which protrudes into an inside of the end turn portion of the coil spring, and an outer connecting portion which surrounds an outside area of the end turn portion of the coil spring.

1 Claim, 11 Drawing Sheets

FOREIGN PATENT DOCUMENTS

| | | |
|---|---|---|
| JP | 5-147066 | 6/1993 |
| JP | 5-200776 | 8/1993 |
| JP | 2525487 | 5/1996 |
| JP | 8-177916 | 7/1996 |
| JP | 08177916 * | 7/1996 |
| JP | 2525487 | 11/1996 |
| JP | 9-290433 | 11/1997 |

* cited by examiner

INSERT-MOLDED ARTICLE, INSERT MOLD AND INSERT MOLDING METHOD

FIELD OF THE INVENTION

The present invention relates to an insert molding technique for inserting a separate member in a mold cavity in advance, and integrating the separate member with a resin.

More specifically, the present invention relates to a molded article in which a coil spring is integrally insert-molded into part of the molded article, and a molding method.

Also, the present invention relates to a molded article in which the molded article is a bearing member, and the end of a coil spring is insert-molded into the bearing member.

BACKGROUND OF THE INVENTION

Conventionally, regarding a product formed by combining and integrating a coil spring and resin-molded article, the coil spring and resin-molded article manufactured separately are often assembled together and integrated in a later step.

Figure 9:
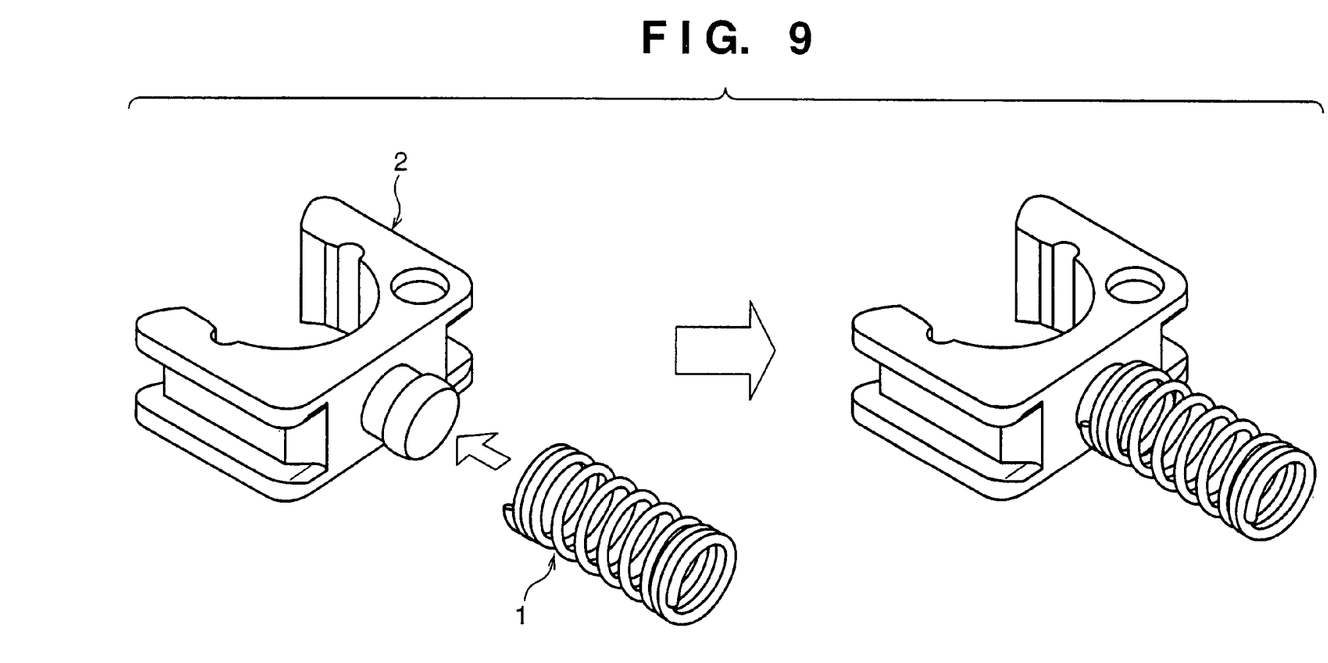
FIG. 9 is a view for explaining a conventional resin-molded article.

As a general prior art, FIG. 9 shows a composite molded article in which a coil spring and resin-molded article manufactured separately are integrated in a later step. Referring to FIG. 9, reference numeral 1 denotes a coil spring; and 2, a resin bearing produced by injection molding.

Figure 11:
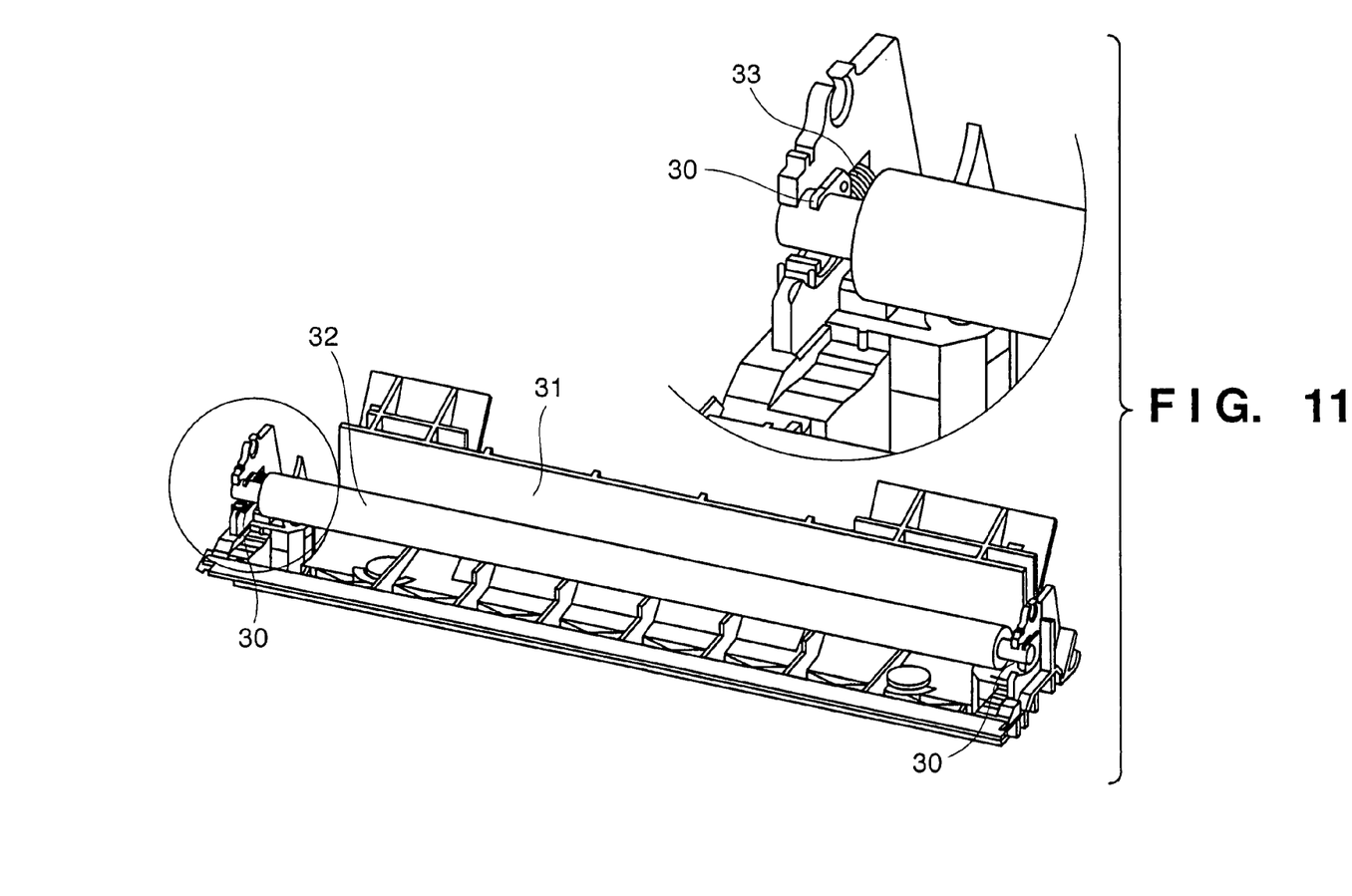
FIG. 11 is a view for explaining a bearing member mounted in a toner cartridge.

The bearing member shown in FIG. 9 is mounted in a toner cartridge of an image forming apparatus (copying machine or printer) which is manufactured by the present applicant. FIG. 11 shows part of the toner cartridge which mounts the bearing member. In FIG. 11, reference numeral 30 denotes a bearing member; 31, a toner cartridge frame body; 32, a shaft member; and 33, a coil spring.

A pair of the bearing members 30 are mounted in the cartridge frame body 31 at an interval. The shaft member 32 is inserted from the openings of the bearing members 30 to hold the ends of the shaft member 32 by both the bearing members.

In this arrangement, the coil spring 1 and bearing 2 manufactured in separate manufacturing steps are integrated by press-fitting the coil spring 1 in the bearing 2 by using an assembling means such as an automatic machine.

When the coil spring 1 and bearing 2 are fitted by loose fitting, they are often integrated by using a means such as adhesion when necessary.

Japanese Utility Model Laid-Open No. 03-013853 discloses a technique for integrating a coil spring and resin-molded article, and Registered Japanese Utility Model No. 2525487 and Japanese Patent Laid-Open No. 5-147066 disclose a technique associated with insert molding.

However, with the conventional arrangement as described above in which the coil spring 1 is pressed into the bearing 2, when the coil spring 1 is being pressed into the bearing 2, the bearing 2 made of a resin material is chipped by the coil spring 1 to produce resin chips. When the resin chips separate from the bearing 2 and attach to another member, they sometimes cause a functional trouble of the toner cartridge. Also, the connecting strength of the coil spring 1 and bearing 2 may decrease, which is a serious defect such as an adverse influence on a bearing function.

Assume that the coil spring 1 and bearing 2 are to be assembled and fitted by loose fitting. In this case, when inserting the coil spring 1 in the bearing 2, the bearing 2 made of the resin material may not be chipped by the coil spring 1 to produce resin chips. However, to prevent the coil spring 1 from dropping from the bearing 2, the coil spring 1 must be fixed to the bearing 2 by using another means such as adhesion. This increases the number of steps and the cost.

When a product including a coil spring 1 press-fitted into a bearing 2 is to be assembled by an automatic machine or the like, coil springs 1 may be entangled with each other on the parts feeder and cannot be separated. Then, supply of the coil springs 1 becomes short, and the automatic machine stops frequently. The entangled coil springs 1 must be separated manually, which is cumbersome. In the steps of transporting and press-fitting the coil springs 1, since the coil springs 1 are flexible, the automatic machine or the like requires fine adjustment and is difficult to be stabilized.

SUMMARY OF THE INVENTION

The present invention has been made in view of the above problems, and has as its object to disuse press fitting of a coil spring into a bearing made of a resin material, to prevent resin chips from being produced during press fitting.

It is another object of the present invention to enable integration of a resin component and coil spring simply at a low cost.

It is still another object of the present invention to prevent entanglement of coil springs so that the coil springs can be supplied smoothly.

It is still another object of the present invention to provide a member which has a spring property like a coil spring, and has a function of preventing the member requiring an elastic function from dropping upon an elastic action, and, more specifically, a bearing member which is formed by insert-molding the coil spring.

That is, when the coil spring is to be attached to the bearing member, as described above, projection is formed at the attachment position of the coil spring in the bearing member, and the coil spring is attached to the projection such that the end of the coil spring is fitted on the projection. As a result, the chips are produced, and the coil spring is readily disconnected. The present invention solves these problems.

In order to achieve the above problems and to achieve the above object, according to the first aspect of the present invention, in an insert-molded article, a coil spring is inserted in a cavity of a mold, the coil spring is exposed in the cavity partly, a molten resin material is injected into the cavity and solidified, and the resin material and a portion of the coil spring which is exposed in the cavity are connected to and integrated with each other.

According to the second aspect of the present invention, an insert mold comprises a cavity where molten resin is to be injected to produce a molded article, and a holding portion to hold a coil spring such that the coil spring is partly exposed in the cavity.

According to the third aspect of the present invention, an insert molding method uses the insert mold described above.

According to the fourth aspect of the present invention, an insert-molded article is produced by using the insert mold described above.

According to the fifth aspect of the present invention, an insert molding method of insert-molding a coil spring member comprises forming a cavity for molding a bearing member in stationary and movable pieces, forming a holding portion molding cavity portion for molding a holding portion which holds an end of the coil spring member in the cavity, inserting the coil spring member into the holding portion molding cavity portion, and closing the pieces to inject a resin material, thereby insert-molding the coil spring member into the bearing member.

According to the sixth aspect of the present invention, an insert molding method of insert-molding a coil spring member into a bearing member comprises forming a bearing member molding cavity for molding the bearing member in stationary and movable pieces for molding the bearing member, forming an inserting portion for inserting the coil spring member to oppose the bearing member molding cavity, inserting the coil spring member into the inserting portion, and injecting a resin material while the coil spring member is kept compressed into the bearing molding cavity.

According to the seventh aspect of the present invention, an insert molding method of insert-molding a coil spring member into a bearing member comprises steps of temporarily stopping a clamping operation while stationary and movable pieces are kept at a predetermined distance, positioning the coil spring member at a predetermined position, resuming the clamping operation and closing the stationary and movable pieces to form a cavity, and injecting a resin material into the cavity.

According to the eighth aspect of the present invention, an insert-molded article wherein a cavity for molding a bearing member in a mold for molding the bearing member is provided, an end of a coil spring member is inserted in the cavity, the end of the coil spring member is insert-molded into the bearing member by injecting a resin material into the cavity, and the other end of the coil spring member is a free terminal.

According to the ninth aspect of the present invention, an insert-molded article in which a metal coil spring is insert-molded comprises a holding portion molding cavity for molding a holding portion which holds the coil spring close to an article molding cavity for forming the molded article, the metal coil spring is arranged close to the article molding cavity, the mold is closed, and the coil spring is insert-molded into the molded article by injecting a resin into the article molding cavity and the holding portion molding cavity.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described in detail with reference to the accompanying drawings.

Figure 1:
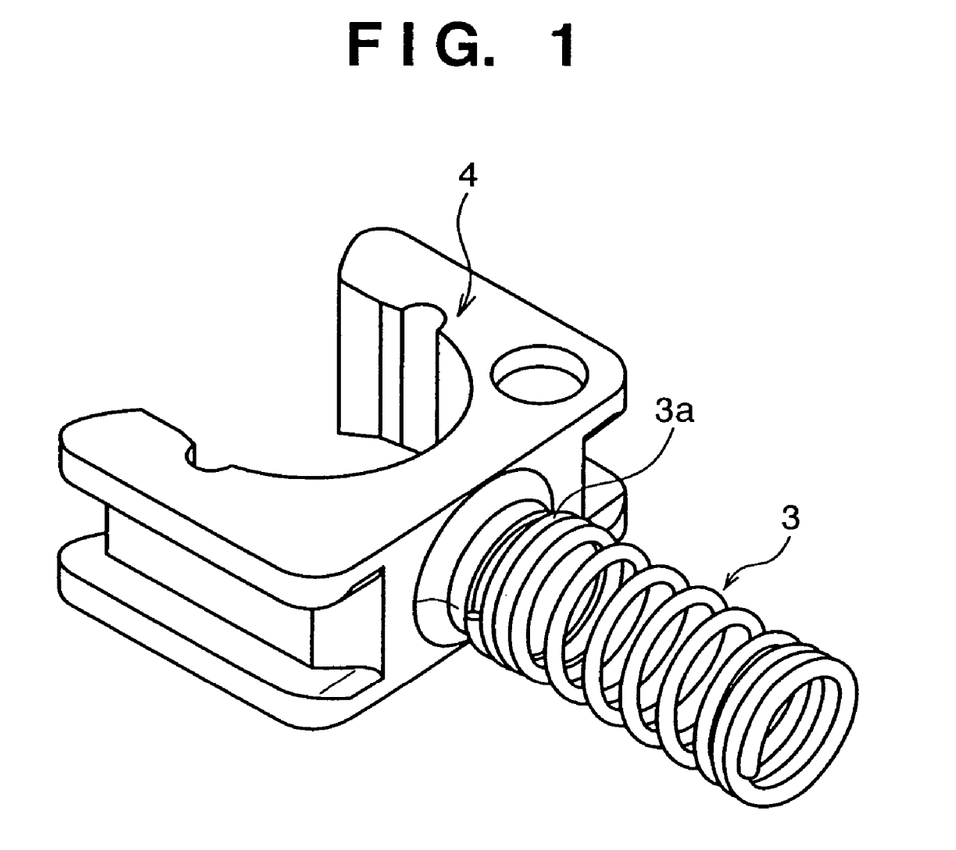
FIG. 1 is a view showing a resin-molded article according to the first embodiment of the present invention.

FIG. 1 is a view showing a resin-molded article according to the first embodiment of the present invention. Referring to FIG. 1, reference numeral 3 denotes a coil spring; and 4, a bearing.

In the above arrangement, the coil spring 3 inserted into a mold such that its end 3a is exposed in the cavity of the mold. Molten resin is injected into the cavity. Then, the molten resin forms the shape of the bearing 4, and enters the inner-diameter portion of the coil spring 3. The molten resin fluidizes to the distal end of a core pin (not shown) inserted in the inner-diameter portion of the coil spring 3, and forms the connecting portion of the coil spring 3 and bearing 4. After a lapse of a predetermined cooling time, the integrated coil spring 3 and bearing 4 are extracted outside the mold.

Figure 2:
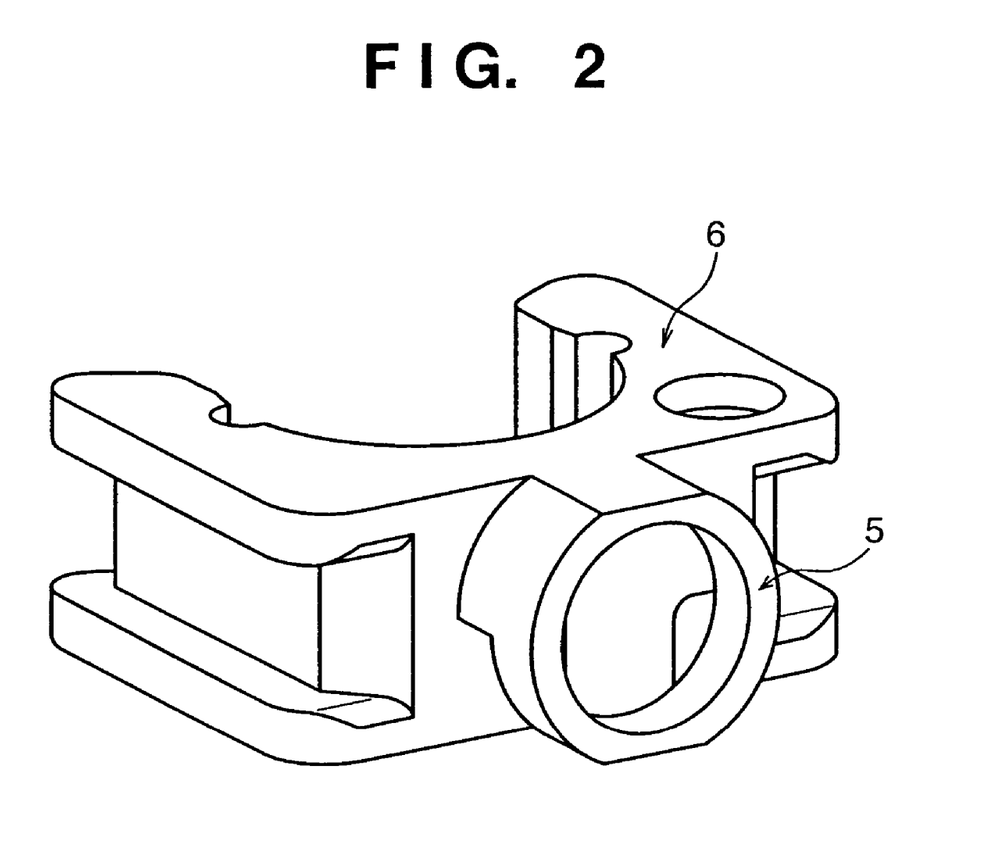
FIG. 2 is a view showing a resin-molded article according to the second embodiment of the present invention.

FIG. 2 shows a resin-molded article according to the second embodiment of the present invention. Referring to FIG. 2, reference numeral 5 denotes a connecting portion with a coil spring; and 6, a bearing.

In the above arrangement, the connecting portion 5 surrounds the coil spring. The outer portion of the coil spring inserted in a mold in advance is partly exposed in the cavity. Molten resin roundly fluidizes around the exposed outer portion of the coil spring and forms the shape of the connecting portion 5. In this case, the coil spring is integrated with the bearing 6 such that the outer portion of the coil spring is held.

Figure 3:
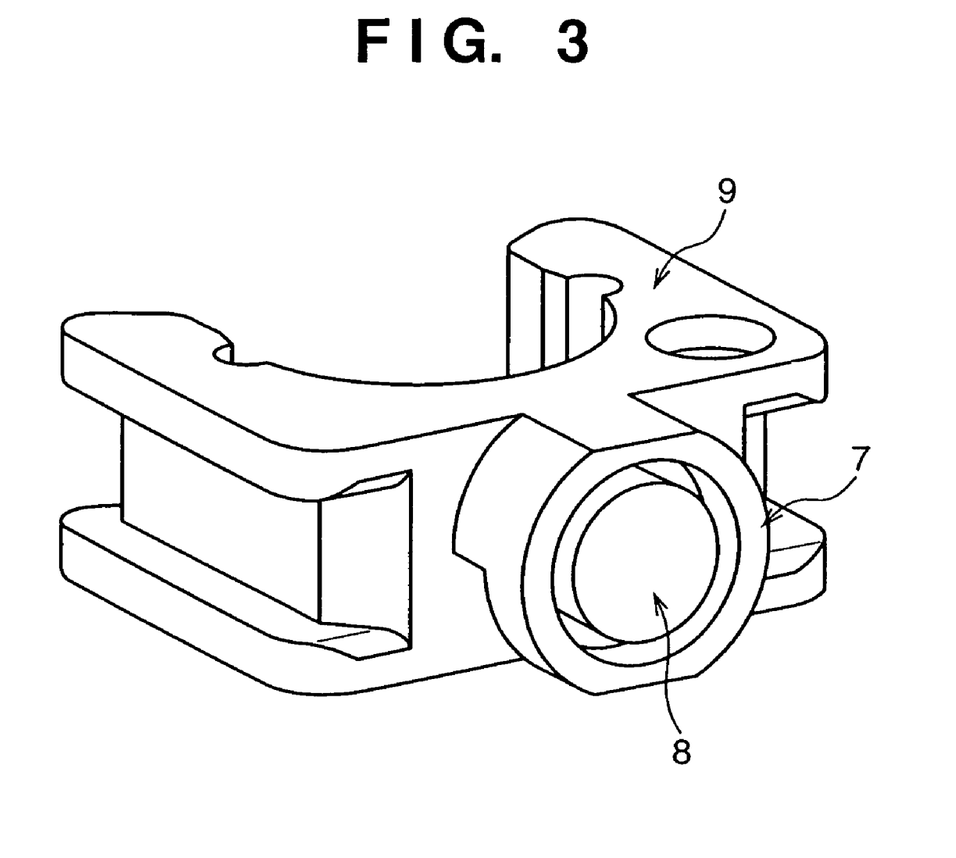
FIG. 3 is a view showing a resin-molded article according to the third embodiment of the present invention.

FIG. 3 is a view showing a resin-molded article according to the third embodiment of the present invention. Referring to FIG. 3, reference numeral 7 denotes an outer-diameter connecting portion of a coil spring; 8, an inner-diameter connecting portion of the coil spring; and 9, a bearing.

In the above arrangement, the outer-diameter connecting portion 7 surrounds the coil spring, and the inner-diameter connecting portion 8 projects into the inner-diameter portion of the coil spring. The end of the coil spring inserted in a mold in advance is exposed in the cavity. Molten resin fluidizes to sandwich the exposed outer- and inner-diameter portions of the coil spring to form the shapes of the outer- and inner-diameter connecting portions 7 and 8. In this case, the coil spring is integrated with the bearing 9 such that both the outer and inner diameters of the coil spring are held.

Figure 4:
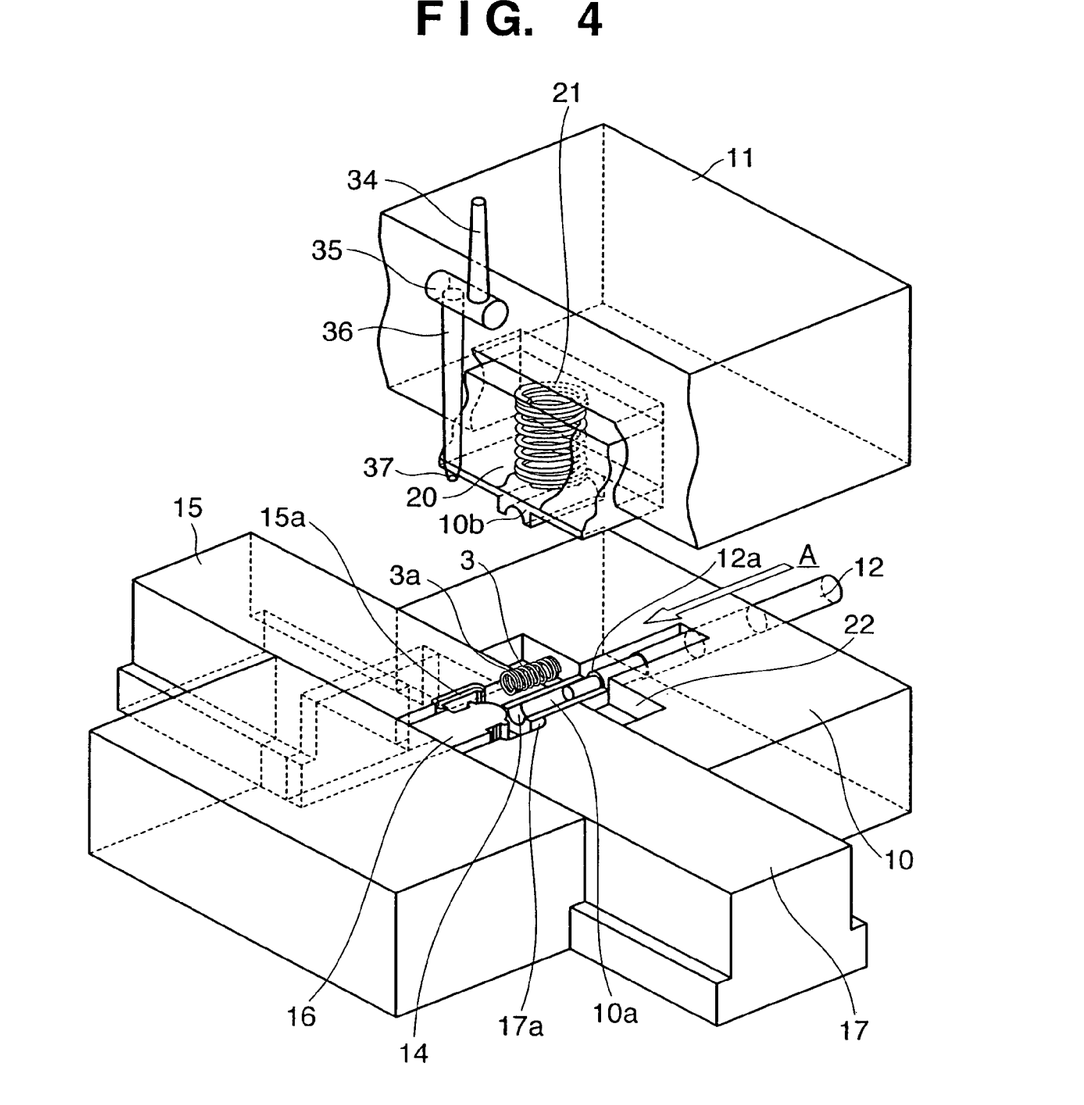
FIG. 4 is a view for explaining an injection mold according to an embodiment of the present invention.

FIG. 4 shows an arrangement example of an injection mold for insert-molding the coil spring to manufacture a bearing member.

Referring to FIG. 4, reference numeral 10 denotes a movable piece; 11, a stationary piece; 12, a core pin to hold a coil spring; 3, a coil spring; 14, a holding portion to compress and hold part of the coil spring in a radial direction; 15, a first slide piece member; 16, a center piece member; and 17, a second slide piece member.

In the above arrangement, the movable piece 10 is attached to a mold on a movable side (not shown). The movable piece 10 has a space for receiving a holding piece 22, which has a space (groove) 10a for arranging the coil spring 3. The slide piece members 15 and 17 are arranged at the center portion of the movable piece 10. The slide piece members 15 and 17 have cavities 15a and 17a for injecting a resin material. Reference numeral 16 denotes a center piece member which is arranged in the cavities 15a and 17a in the slide piece members 15 and 17. The distal end of the center piece member 16 is semicircular, and a projection is formed at the semicircular base portion. Reference numeral 12 denotes a core pin member which forms the shapes of large-, middle-, and small-diameter cylinders. The core pin member 12 is arranged in the space 10a formed in the movable piece member 10 and the holding piece member 22.

After the coil spring 3 is set in the groove 10a, the core pin 12 is moved by a press means which applies the pressure in an axial direction (direction of an arrow A shown in FIG. 4) of the coil spring 3, and is inserted in the coil spring 3. At this time, the core pin 12 compresses the coil spring 3 with a step portion 12a by a predetermined amount in the axial direction. The movable and stationary pieces 10 and 11 are provided with the holding portion 14 which compresses and holds part of the coil spring 3 in the radial direction. The holding portion 14 can compress and hold part of the coil spring 3 which is inserted in the groove 10a of the holding piece 22 and the inner diameter of which is held by the core pin 12, more specifically, the outer-diameter portion of the coil spring on a side to be connected to the resin. An end 3a of the coil spring 3 projects into a cavity formed by the first slide piece member 15, center piece member 16, and second slide piece member 17, and is integrated with the resin injected into the cavity.

Figure 10:
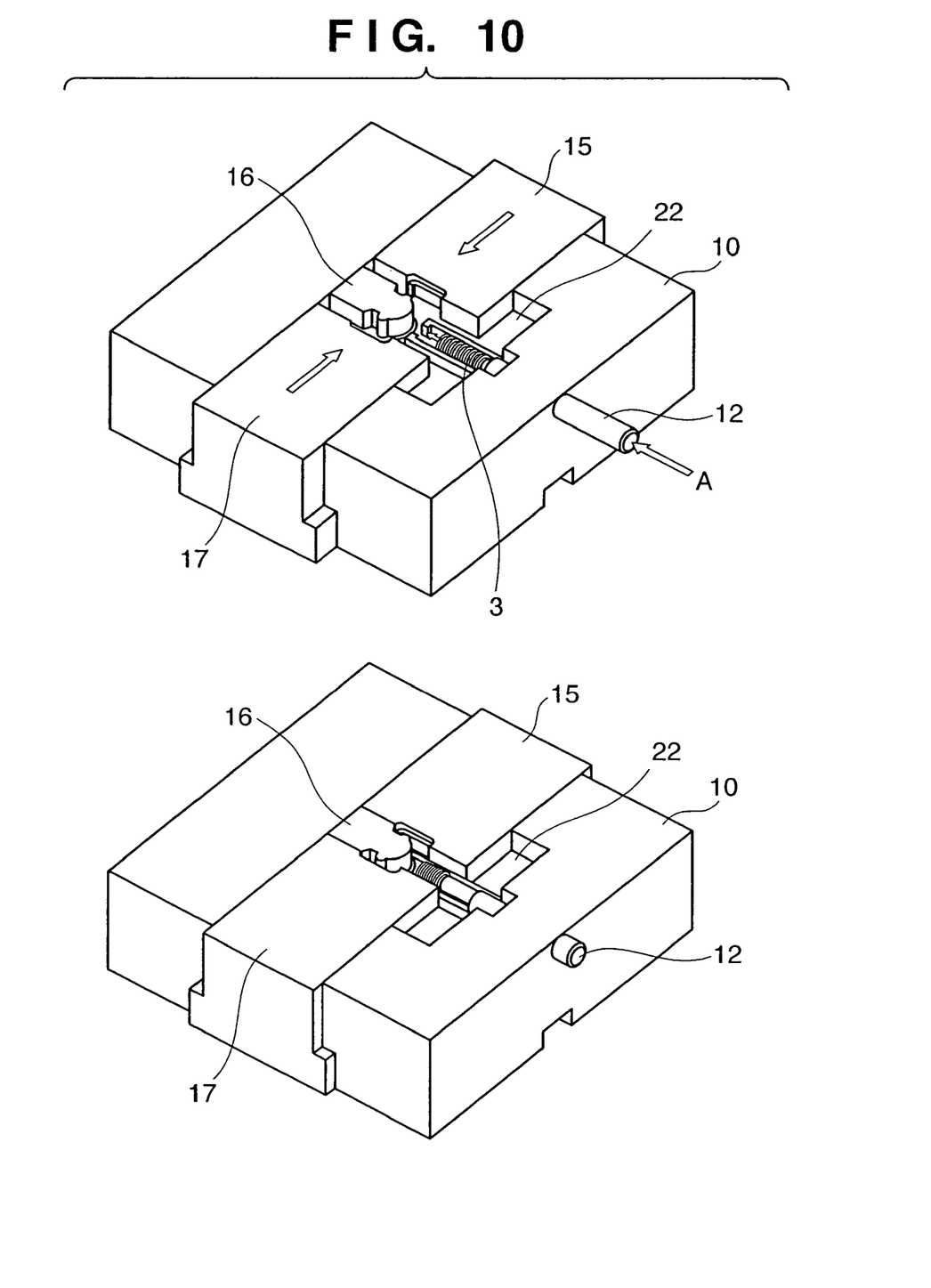
FIG. 10 is a view for explaining a state in which the coil spring is compressed in an axial direction.

FIG. 10 shows a state in which the coil spring is compressed in the axial direction.

The space formed by the slide piece members 15 and 17, center piece member 16, and core pin 12 is a cavity in which the bearing member of the molded article is formed.

Referring back to FIG. 4, reference numeral 11 denotes a stationary piece member which is fixed to a stationary member (not shown) so as to oppose the movable piece member 10.

In the stationary piece member 11, a space for receiving a press piece 20 is formed. The press piece 20 has a semicircular space 10b corresponding to the semicircular space 10a for inserting the coil spring 3 in the holding piece 22. The coil spring member 21 for compressing the press piece member 20 to the holding piece member 22 is also attached to the stationary piece member 11.

In the above arrangement, the cavity space formed by the slide piece members 15 and 17 and the center piece member 16 forms a resin injection cavity for molding the bearing member. Then, the coil spring 3 is arranged in the coil spring arrangement space of the slide piece members 15 and 17 such that the coil spring 3 opposes the resin injection cavity space. The coil spring is pressed into the semicircular head portion of the center piece member 16 by the pressure force of the core pin 12, thereby arranging the coil spring 3 in the state wherein the coil spring 3 is partially inserted into the resin injection cavity. After that, the resin material is injected into the resin injection cavity so that the distal end 3a of the coil spring is inserted and fixed in the molded article.

The molding operation of insert-molding the coil spring into the bearing member using a mold having the above-described structure will be described next.

The resin material used in this embodiment is polyoxymethylene (POM). A molten resin material is injected from an injection cylinder on the side of an injection molding apparatus in FIG. 4 through a primary sprue 34, runner 35, secondary sprue 36, and gate 37 of the mold in FIG. 4. The injected molten resin material is injected from the gate 37 into the cavity for molding the bearing material, and sequentially filled in the cavity. As the resin material is injected in the cavity, the resin material also flows into the cavity portion (holding portion molding cavity portion) of the coil spring 3 arranged in an article molding cavity, thereby partly injecting the resin material into the distal end (inner-diameter) of the coil spring 3.

Figure 5:
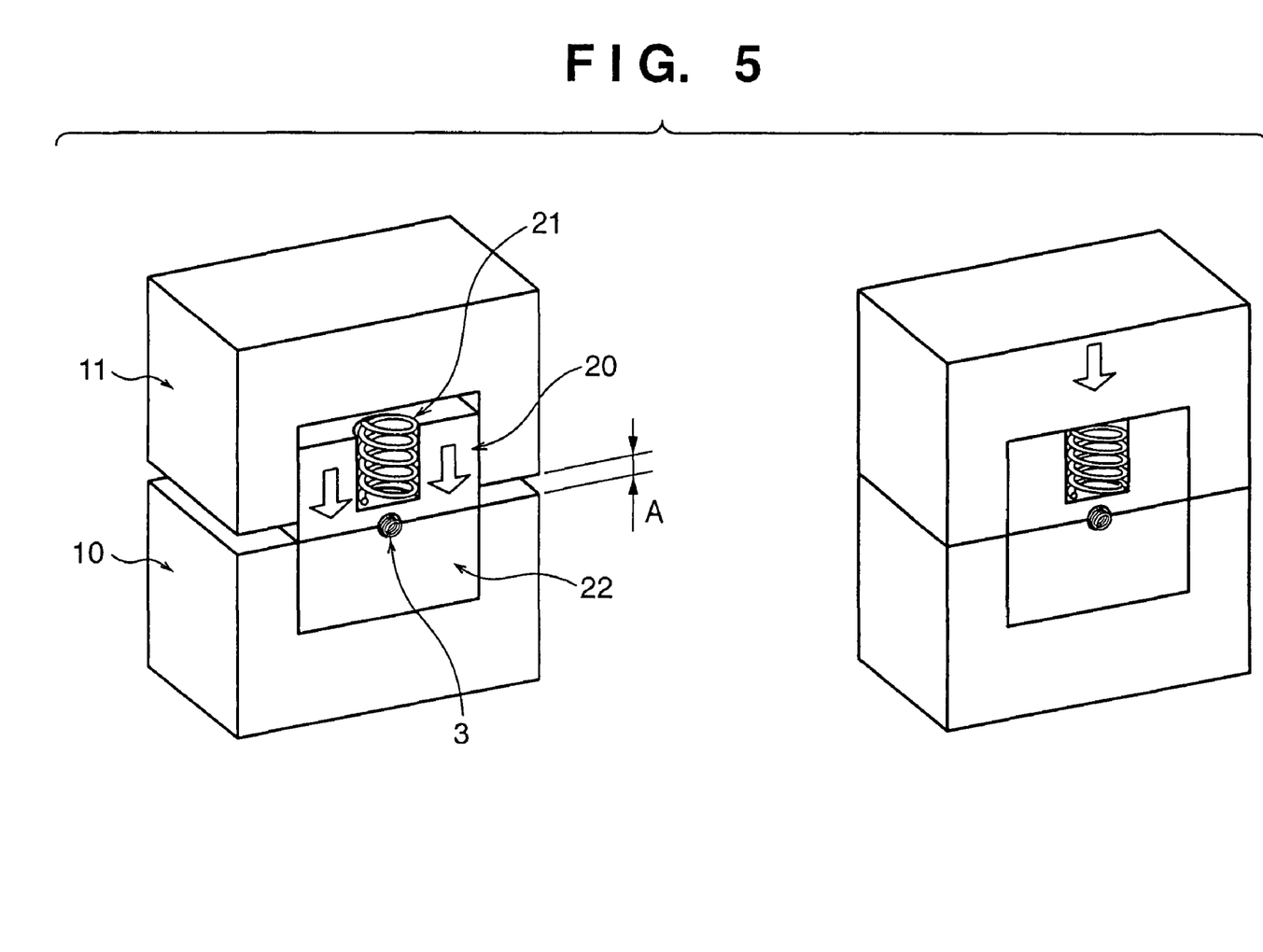
FIG. 5 is a view for explaining an injection mold according to an embodiment of the present invention.

FIG. 5 is a view for explaining an insert mold according to an embodiment of the present invention, and is a schematic view of a relationship among the stationary piece, movable piece, press piece, and holding piece.

Referring to FIG. 5, reference numeral 11 denotes a stationary piece; 10, a movable piece; 20, a press piece which can move in the stationary piece 11; 21, a coil spring provided to the press piece 20; 22, a holding piece which holds a coil spring 3 in the movable nesting piece 10; and 3, the inserted coil spring. The press piece 20 and movable piece 22 elastically compress and hold the coil spring 3 as a pair of the holding pieces.

In the above arrangement, when the mold is to be closed prior to resin injection, the mold clamping operation is temporarily stopped with the PL (Parting Line) surfaces of the stationary and movable pieces 11 and 10 being open by a size indicated by A in FIG. 5. At this time, the press piece 20 provided on the side of the stationary piece 11 is biased by the coil spring 21 to project toward the movable piece 10 rather than the stationary piece 11, and is compressed to the holding piece 22 which holds the coil spring 3 on the side of the movable piece 10, with the spring pressure of the coil spring 21. In this state, the inserted coil spring 3 is moved in the axial direction, and is positioned at a predetermined position. After this, the mold clamping operation is resumed. The gap between PL surfaces of the stationary and movable nesting pieces 11 and 10 disappears, and regular mold clamping is completed.

Figure 6:
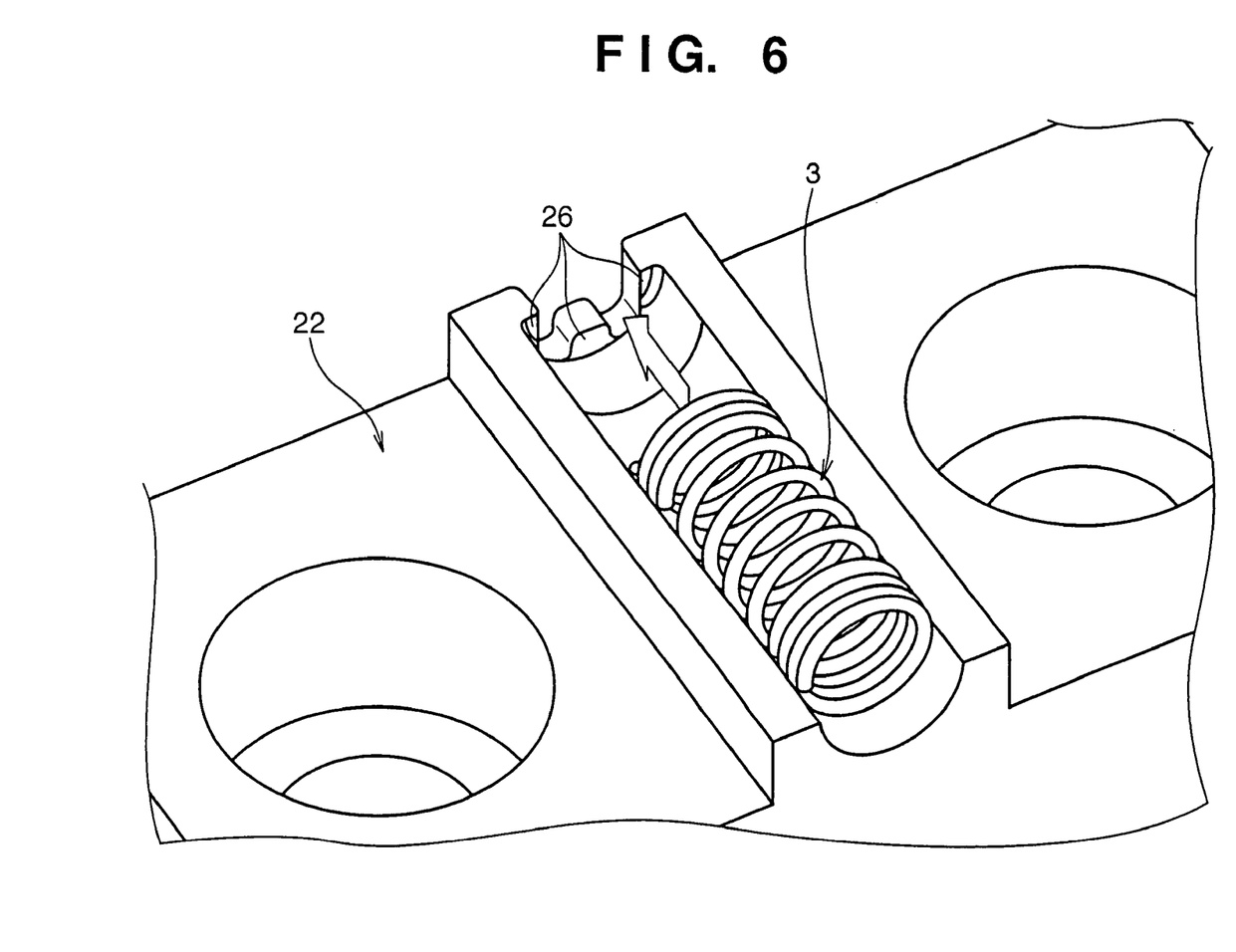
FIG. 6 is a view for explaining an injection mold according to an embodiment of the present invention.

FIG. 6 is a view for explaining an insert mold according to an embodiment of the present invention, and is an enlarged view of a connecting portion of the coil spring and the resin. Referring to FIG. 6, reference numeral 22 denotes a holding piece; 3, a coil spring; and 26, stoppers.

In this arrangement, the stoppers 26 are formed at the connecting portion of the coil spring 3 and resin. Thus, when inserting the coil spring 3 at a predetermined position of the holding piece 22 in a mold, the coil spring 3 will not project into the cavity exceeding a predetermined size.

Figure 7:
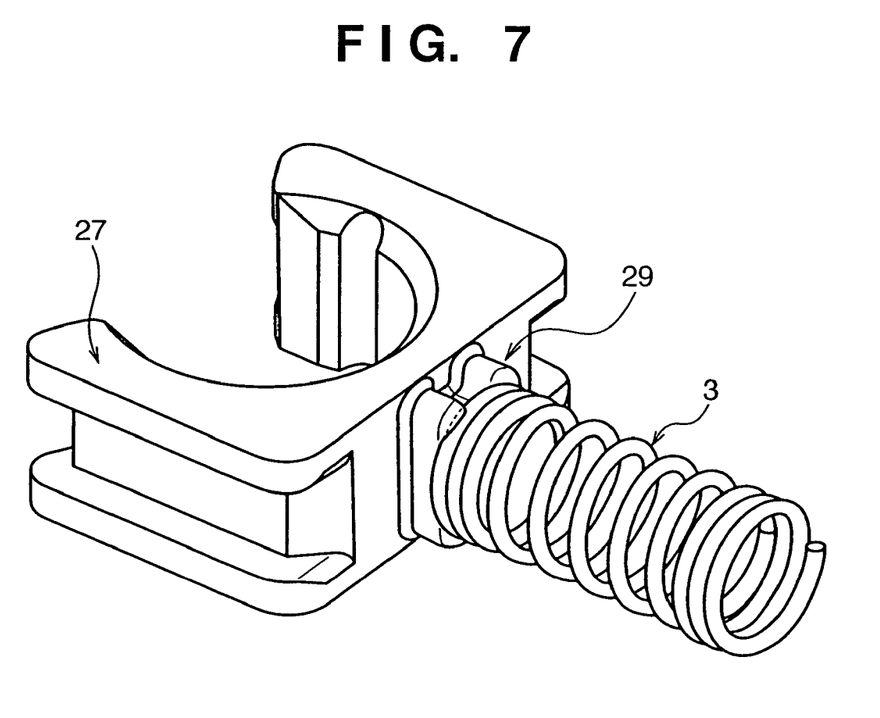
FIG. 7 is a view showing a resin-molded article according to the fourth embodiment of the present invention.

FIG. 7 is a view for explaining an insert-molded article according to the fourth embodiment of the present invention. Referring to FIG. 7, reference numeral 27 denotes a bearing; 3, a coil spring; and 29, a pawl arranged at the connecting portion of the bearing 27 and coil spring 3.

In this arrangement, the pawl 29 covers the outer portion of the coil spring 3 entirely or partly with resin.

Figure 8:
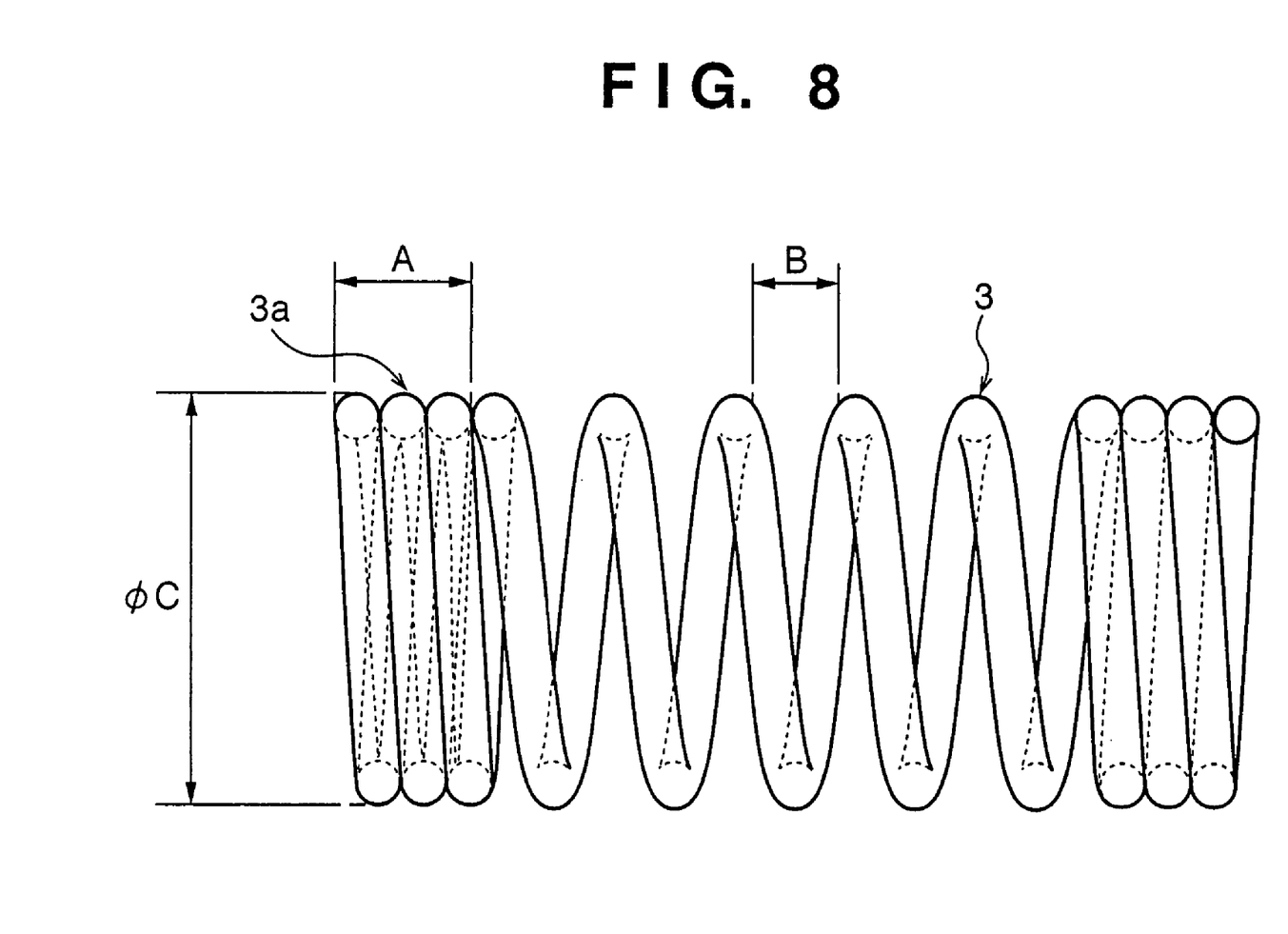
FIG. 8 is a view for explaining a coil spring according to an embodiment of the present invention.

FIG. 8 is a view for explaining a coil spring according to an embodiment of the present invention. Referring to FIG. 8, reference numeral 3 denotes a coil spring; and 3a, an end turn portion at the end of the coil spring.

In this arrangement, the number of turns of the end turn portion 3a of the coil spring is three or four. A width A of the end turn portion 3a of the coil spring 3 is larger than a gap B formed by the lead of the coil. A coil diameter C is designed to be larger than the gap B formed by the lead of the coil.

These cases are merely examples and many other combinations of a resin-molded article and coil spring shape are possible. The present invention is accordingly not limited to the above examples.

As described above, when the coil spring is inserted in the mold, the coil spring is partly exposed in the cavity, and the exposed portion of the coil spring and resin are integrated, the assembling step can be disused, and the number of steps and the cost can be decreased. Resin chips that are produced when inserting and assembling the coil spring in a resin component in a later step can be prevented. Also, frequent stop of the automatic machine, which occurs when inserting and assembling the coil spring in the resin component in the later step, can be suppressed.

When the coil spring is to be inserted in the mold, the coil spring is to be partly exposed in the cavity, and the exposed portion of the coil spring and resin are to be integrated, if part of the coil spring is compressed and held in the radial direction, the coil spring may not be shifted by pressure generated when the resin is injected, or no burr may be formed.

Assume that the coil spring is to be inserted in the mold, that the coil spring is to be partly exposed in the cavity, and that the exposed portion of the coil spring and resin are to be integrated. If pieces for holding the coil spring have a structure movable in the mold clamping direction, prior to clamping the mold, the mold can be temporarily clamped such that the pieces that hold the coil spring are kept at a predetermined distance, after that the coil spring can be moved to and positioned at predetermined positions of the pieces, and regular mold clamping can be performed. This is effective in positioning the coil spring accurately.

When the coil spring is to be inserted in the mold, the coil spring is to be partly exposed in the cavity, and the exposed portion of the coil spring and resin are to be integrated, if the coil spring is compressed in the lengthwise direction, the coil spring will not be shifted by the pressure of the resin, or no burr may be formed.

When the coil spring is to be inserted in the mold, the coil spring is to be partly exposed in the cavity, and the exposed portion of the coil spring and resin are to be integrated, if a stopper is provided to the connecting portion of the coil spring and resin, the coil spring will not project into the cavity more than necessary. When the coil spring is to be inserted in the mold, the coil spring is to be partly exposed in the cavity, and the exposed portion of the coil spring and resin are to be integrated, if the outer portion of the coil spring is covered with a resin partly or entirely, the connecting strength of the resin and coil spring can be increased.

When the coil spring is to be inserted in the mold, the coil spring is to be partly exposed in the cavity, and the exposed portion of the coil spring and resin are to be integrated, if the number of turns of the end turn portion at the end of the coil spring is set to three, four, or more, the connecting length of the resin and coil spring can be ensured sufficiently, and the connecting strength of the resin and coil spring can be increased.

When the coil spring is to be inserted in the mold, the coil spring is to be partly exposed in the cavity, and the exposed portion of the coil spring and resin are to be integrated, if the width of the end turn portion of the coil spring is larger than the gap formed by the lead of the coil, coil springs will not be entangled with each other, and any trouble in supply of the coil springs during insert-molding can be prevented.

When the coil spring is to be inserted in the mold, the coil spring is to be partly exposed in the cavity, and the exposed portion of the coil spring and resin are to be integrated, if the coil diameter is set larger than the gap formed by the lead of the coil, coil springs will not be entangled with each other, and any trouble in supply of the coil spring during insert-molding can be prevented.

When the coil spring is to be inserted in the mold, the coil spring is to be partly exposed in the cavity, and the exposed portion of the coil spring and resin are to be integrated, if the insert mold or coil spring described above is used, molding can be performed at a low cost with a stable quality.

As described above, according to the above embodiments, press fitting of a coil spring into a bearing made of a resin material can be disused. Thus, resin chips produced during press fitting can be prevented.

The resin component and coil spring can be integrated simply at a low cost.

Entanglement of coil springs with each other can be prevented, so that the coil springs can be supplied smoothly.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2003-199359 filed on Jul. 18, 2003, and 2004-172999 filed on Jun. 10, 2004, which are hereby incorporated by reference herein.

What is claimed is:

1. A bearing apparatus, comprising:
a coil spring having a center portion in which a wire is wound at a predetermined pitch, and first and second end turn portions arranged at end portions of the center portion, wherein each of the end turn portions is formed by winding the wire three or more turns in a state that adjacent turned wires contact each other; and
a bearing member having a main body with an opening, having a central axis, for supporting a shaft, and a connecting portion for connecting the coil spring to the main body in a state that a direction of a central axis of the coil spring is different from a direction of the central axis of the opening, wherein the main body and the connecting portion are integrally formed from a same molten resin material by molding, and the first end turn portion of the coil spring is connected to the connecting portion through molding of the main body and the connecting portion,
wherein the connecting portion of the bearing member has an inner connecting portion which protrudes into an inside of the first end turn portion of the coil spring, and an outer connecting portion which surrounds an outside area of the first end turn portion of the coil spring, with the inner connecting portion and the outer connecting portion being formed from the same molten resin material, and
wherein the first end turn portion of the coil spring is sandwiched between the inner connecting portion and the outer connecting portion from inside and outside of the first end turn portion, and the outer connecting portion is formed from a pawl arranged at a predetermined interval around the first end turn portion of the coil spring.

* * * * *